United States Patent [19]

Vasile

[11] 3,870,975

[45] Mar. 11, 1975

[54] SURFACE WAVE TRANSDUCER WITH REDUCED REFLECTION COEFFICIENT

[75] Inventor: Carmine F. Vasile, Greenlawn, N.Y.

[73] Assignee: Hazeltine Corporation, Greenlawn, N.Y.

[22] Filed: Mar. 22, 1974

[21] Appl. No.: 453,617

[52] U.S. Cl. .................... 333/30 R, 310/9.8, 333/72

[51] Int. Cl. ........ H03h 9/02, H03h 9/26, H03h 9/30

[58] Field of Search ......... 333/30 R, 72; 310/8, 8.1, 310/9.7, 9.8

[56] References Cited

UNITED STATES PATENTS 3,792,381 2/1974 Bristol .................................. 333/72

3,803,520 4/1974 Bristol et al. ...................... 333/30 R

*Primary Examiner*—James W. Lawrence

*Assistant Examiner*—Marvin Nussbaum

[57] ABSTRACT

Disclosed is an acoustic surface wave transducer having three conductive fingers per acoustic wavelength. Surface waves are excited by applying electrical signals across a pair of terminals. One terminal is connected to every third conductive finger in the transducer and the other terminal to the remaining conductive fingers.

6 Claims, 2 Drawing Figures

PATENTED MAR 11 1975

3,870,975

SURFACE WAVE TRANSDUCER WITH REDUCED REFLECTION COEFFICIENT

BACKGROUND OF THE INVENTION

This invention relates to acoustic surface wave devices and more particularly to interdigital transducers for coupling electrical signals to acoustic surface waves on a piezoelectric substrate.

Acoustic surface wave devices make use of piezoelectric materials on which a mechanical surface wave can be launched by a transducer in response to electric signals. The mechanical surface waves have a propagation velocity which is much lower than the propagation velocity of electrical signals causing such devices to have valuable properties as delay lines and various types of filters.

The most commonly used prior art surface wave transducers have two conductive elements per acoustic wave. The transducer is formed by interconnecting alternate conductive fingers to form a first array of conductive fingers and interconnecting the remaining conductive fingers to form a second array of conductive fingers. In operation electrical signals are applied across the two arrays of conductive fingers thereby exciting the piezoelectric substrate with electrical signals having a polarity reversal at every half wavelength interval. The electrical signals applied to the two arrays may be either a balanced electrical signal with one component of the signal applied to each of the arrays or may be an unbalanced electrical signal wherein a single-phase signal is applied to one array and the other array is grounded.

A significant disadvantage of the prior art transducer having two conductive fingers per acoustic wavelength is that such transducers tend to have a high reflection coefficient to acoustic surface waves. When surface waves are incident on the conductive fingers of any interdigital transducer, each of the conductive fingers reflects a small amount of the incident surface waves. In the prior art transducer wherein the conductive fingers are spaced a half-wavelength apart the reflection from each successive finger undergoes a phase shift of an integral number of acoustic wavelengths with respect to the reflection from the first conductive finger. The result of this phase shift of an integral number of wavelengths is that the individual reflections of surface waves from the conductive fingers tend to reinforce resulting in a large total reflection for the transducer. Reflections of surface waves from transducers are undesired because they result in power loss and spurious responses in acoustic surface wave devices, commonly known as "triple transit."

In U.S. Pat. No. 3,727,155, DeVries shows an interdigital transducer having four conductive fingers per acoustic wavelength. This transducer has a lower surface wave reflection by reason of the one-quarter wavelength spacing of the conductive fingers on the piezoelectric substrate. The quarter wavelength spacing tends to result in a cancellation of the individual reflections from the conductive fingers on the substrate. One difficulty associated with this prior art transducer is the resolution required to deposit this pattern of conductive fingers onto a substrate, which is twice that required for a transducer having two conductive fingers per acoustic wavelength. Therefore there are serious fabrication difficulties associated with this transducer.

In U.S. Pat. No. 3,686,518, Hartmann discloses an acoustic surface wave transducer having three conductive fingers per acoustic wavelength. The transducer disclosed by Hartmann is a unidirectional transducer which requires the use of three-phase electrical signals applied to the three interleaved arrays of conductive fingers. While transducers constructed in accordance with the present invention do not have the desirable feature of unidirectionality and associated low insertion loss, they are more easily used than Hartmann's transducer, since only single-phase electrical signals are required.

It is therefore an object of the present invention to provide an acoustic surface wave transducer having a reduced reflective coefficient for incident surface waves.

It is a further object of the present invention to provide such a transducer wherein the required resolution for depositing the conductive fingers on a substrate is not as severe as prior art transducers having a reduced reflective coefficient.

It is a still further object of the present invention to provide such a transducer which may be easily excited by single-phase electrical signals.

In accordance with the present invention there is provided an acoustic surface wave transducer for coupling electric signals in a selected frequency band to acoustic surface waves on a piezoelectric substrate. The transducer includes a first array of conductive fingers disposed on one surface of the piezoelectric substrate and having a center-to-center spacing between adjacent pairs of conductive fingers of one acoustic wavelength at a selected frequency within the selected frequency band. The transducer further includes first conductive means for electrically connecting the fingers of the first array. There is also included a second array of conductive fingers disposed on the same surface of the piezoelectric substrate and interleaved with the first array such that there are two conductive fingers in the second array between each pair of adjacent fingers in the first array. There is also included second conductive means for connecting the fingers of the second array when electric signals in the selected frequency band are supplied across the first and second conductive means, the acoustic surface wave propagates on the piezoelectric substrate.

DESCRIPTION FOR OPERATION OF THE EMBODIMENT OF FIG. 1

Figure 1:
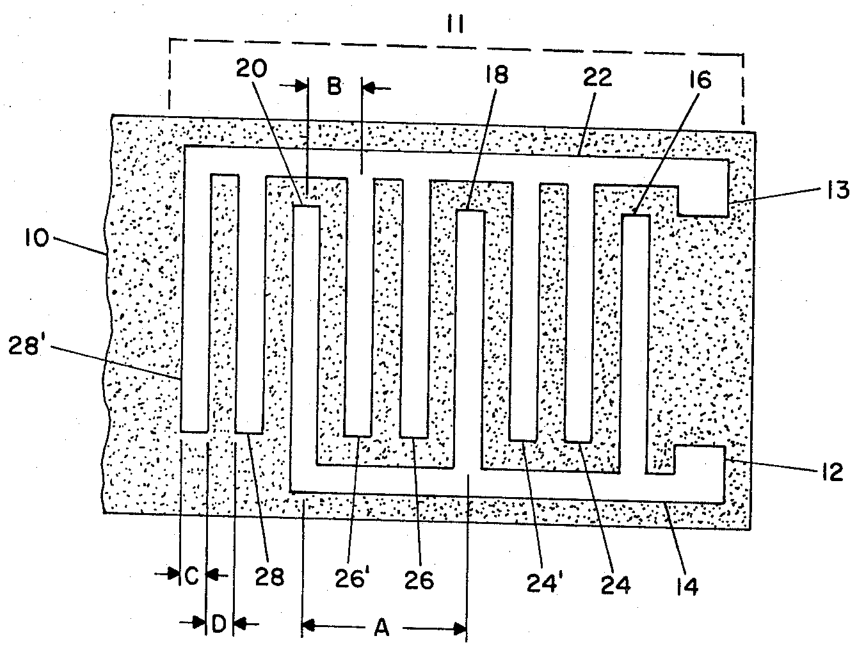
FIG. 1 shows an acoustic surface wave transducer constructed in accordance with the present invention.

FIG. 1 is an illustration of an acoustic surface wave device which includes a transducer constructed in accordance with present invention. The acoustic surface wave device of FIG. 1 includes a piezoelectric substrate 10 and an acoustic surface wave transducer 11 which is formed by the deposition of conductive material on the piezoelectric substrate. Transducer 11 has first and second input terminal 12 and 13. Terminal 12 is connected by conductive strip 14 to conductive fingers 16, 18 and 20, which in the embodiment of FIG. 1 are equally spaced on the surface of the substrate by distance A. Terminal 13 is connected by conductive strip 22 to conductive fingers 24, 24', 26, 26', 28 and 28'. The conductive fingers connected to conductive strip 22 are arranged in pairs and interleaved with the conductive fingers 16, 18 and 20 such that there are two conductive fingers connected to strip 22 between each pair of adjacent fingers connected to conductive strip 14. Conductive fingers 16, 18 and 20 comprise a first array of conductive fingers disposed on the surface of the piezoelectric substrate. Conductive strip 14 comprises a first conductive means for electrically connecting the fingers of said first array. Conductive fingers 24, 24', 26, 26', 28 and 28' comprise a second array of conductive fingers disposed on the same surface of the piezoelectric substrate as the first array of conductive fingers. Conductive strip 22 comprises a second conductive means for connecting the fingers of the second array.

The center-to-center spacing A between adjacent conductive fingers of the first array corresponds to the fundamental periodicity of the transducer. The periodicity is the spacing at which the pattern of conductive fingers of the transducer is repeated. As in most prior art acoustic surface wave transducers, the periodicity A corresponds to one acoustic wavelength at a selected frequency within the frequency band within which the transducer is designed to operate. Since the periodicity A corresponds to the spacing within which there are three conductive fingers in the transducer, the transducer is most easily fabricated by having the center-to-center spacing B between adjacent conductive fingers substantially uniform and equal to one-third of the transducer periodicity A or one-third of the acoustic wavelength at a selected frequency within the operating frequency band. Fabrication is also facilitated by having the width C of each finger of the transducer substantially equal to the spacing D between adjacent fingers. This width C and spacing D in the embodiment of FIG. 1 is equal to one-sixth of an acoustic wavelength at a selected frequency in the frequency band.

Transducers constructed in accordance with the present invention have substantially the same coupling effect as prior art transducers having two conductive fingers per acoustic wave, which were discussed above. In the case of the present invention the conductive fingers 16, 18, and 20 of the first array in the transducer are spaced at intervals of approximately one wavelength as in the prior art and have substantially the same coupling effect as the first array of conductive fingers in the prior art transducer. In accordance with the present invention a second array is formed of pairs of conductive fingers 24, 24', 26, 26', 28, and 28' located between adjacent conductive fingers of the first array. The pairs of conductive fingers in the second array are interconnected and in operation are excited with electrical signals of the opposite polarity to the signals applied to the first array. The pairs of conductive fingers in the second array have substantially the same coupling effect as the single conductive fingers in the second array of the prior art transducer, since the pair is centered around a location approximately a half acoustic wavelength from the fingers of the first array. When electrical signals are applied across the two arrays of the present transducer, the piezoelectric substrate is excited with electrical signals having a polarity reversal at every half-wavelength interval as in the prior art transducer and propagation of a bidirectional acoustic surface wave results. As in the prior art transducer electrical signals may be applied across the arrays of conductive fingers by use of either a single phase or a balanced electrical signal.

However, transducers constructed in accordance with the present invention have three conductive fingers per acoustic wavelength spaced approximately one-third of an acoustic wavelength apart. Unlike prior art transducers the reflections from successive fingers do not have a phase shift which is an integral number of wavelengths with respect to the reflection from the first conductive finger, rather the individual reflections have a phase shift which is an integral multiple of approximately two-thirds of a wavelength. As a result since the individual reflections from successive conductive fingers have phases which are integral multiples of approximately two-thirds of a wavelength, such reflections tend to cancel rather than reinforce, resulting in a small overall transducer reflection.

In accordance with the present invention it is possible to substantially eliminate surface wave reflections from transducer fingers at a particular frequency. Prior art transducers having two conductive fingers per acoustic wavelength have substantial reflections from the conductive fingers. For example a prior art transducer four wavelengths in length having eight conductive fingers and a lithium niobate substrate would have approximately −14 dB reflection coefficient to acoustic surface waves from the conductive fingers. The present invention substantially eliminates reflections from this cause thereby improving overall transducer efficiency and device performance.

Figure 2:
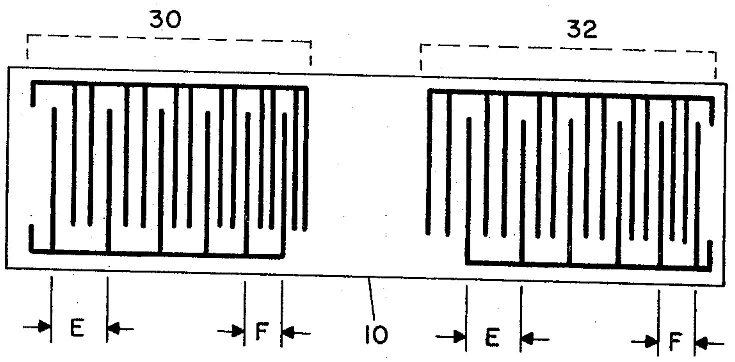
FIG. 2 is an acoustic surface wave device constructed in accordance with the present invention.

FIG. 2 shows an acoustic surface wave device constructed in accordance with the present invention. The device includes a piezoelectric substrate 10 and transducers 30 and 32 deposited thereon. Transducers 30 and 32 differ from transducer 11 in FIG. 1 since the periodicity at which the pattern of conductive fingers is repeated is not uniform. Transducers 30 and 32 have a fundamental periodicity E for the conductive fingers at one end of the transducer which corresponds to one acoustic wavelength at a relatively low frequency within the operating frequency band. The periodicity of transducer 30 is tapered throughout the length of the transducer and at the other end of transducer 30 the periodicity F corresponds to one acoustic wavelength at a relatively high frequency within the operating frequency band. The use of a transducer with such tapered periodicity results in a device with a relatively broad range of operating frequencies. Surface waves are launched at the portion of the transducer at which the periodicity most nearly corresponds to one acoustic wavelength at the frequency of the applied electrical signals. Transducer 32 is also shown to have a tapered periodicity and is tapered in a manner such that all frequencies of applied electrical signals undergo approximately the same delay in the surface wave device of FIG. 2. Reverse tapering may also be used to achieve a device for use as a pulse-expansion or pulse-compression filter.

While the operation of a typical transducer embodying the present invention has been described with reference to coupling electrical signals to acoustic surface waves, it is well known in the art that such transducers are reciprocal and may be used to couple acoustic surface waves to electrical signals. Accordingly, the appended claims are intended to be construed as covering transducers used for both modes of coupling.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An acoustic surface wave transducer for coupling electrical signals in a selected frequency band to acoustic surface waves on a piezoelectric substrate, comprising:

a first array of conductive fingers disposed on one surface of said piezoelectric substrate and having a center-to-center spacing between adjacent pairs of conductive fingers of one acoustic wavelength at a selected frequency within said selected frequency band;

first conductive means for electrically connecting the fingers of said first array;

a second array of conductive fingers disposed on the same surface of said piezoelectric substrate and interleaved with said first array such that there are two conductive fingers in said second array between each pair of adjacent fingers in said first array;

and second conductive means for connecting the fingers of said second array;

whereby, when electrical signals in said selected frequency band are applied across said first and second conductive means, it causes an acoustic surface wave to propagate on said piezoelectric substrate.

2. An acoustic surface wave transducer as specified in claim 1 wherein said two conductive fingers in said second array which are between each pair of adjacent fingers in said first array have a center-to-center spacing of one-third of an acoustic wavelength at a selected frequency in said frequency band.

3. An acoustic surface wave transducer as specified in claim 1 wherein the center-to-center spacing between adjacent pairs of conductive fingers in said first array is tapered over the length of said first array.

4. An acoustic surface wave device comprising: a piezoelectric substrate, a first transducer responsive to electrical signals for launching acoustic surface waves in a selected frequency band and a second transducer responsive to said acoustic surface waves for developing output electrical signals, at least one of said transducers comprising:

a first array of conductive fingers, disposed on one surface of said piezoelectric substrate and having a center-to-center spacing between adjacent pairs of conductive fingers of one acoustic wavelength at a selected frequency within said selected frequency band;

first conductive means for electrically connecting the fingers of said first array;

a second array of conductive fingers disposed on the same surface of said piezoelectric substrate and interleaved with said first array such that there are two conductive fingers in said second array between each pair of adjacent fingers in said first array;

and second conductive means for connecting the fingers of said second array.

5. An acoustic surface wave transducer for coupling electrical signals in a selected frequency band to acoustic surface wave on a piezoelectric substrate, comprising:

a first array of conductive fingers disposed on one surface of said piezoelectric substrate and having a center-to-center spacing between adjacent pairs of conductive fingers of one acoustic wavelength at a selected frequency within said selected frequency band;

first conductive means for electrically connecting the fingers of said first array;

a second array of conductive fingers disposed on the same surface of said piezoelectric substrate and interleaved with said first array such that there are two conductive fingers in said second array between each pair of adjacent fingers in said first array, said two conductive fingers in said second array which are between each pair of adjacent fingers in said first array having a center-to-center spacing of one-third of an acoustic wavelength at a selected frequency in said frequency band and each of the fingers of said second array having with respect to the adjacent finger of said first array a center-to-center spacing of one-third of an acoustic wavelength at a selected frequency in said frequency band;

and second conductive means for connecting the fingers of said second array;

whereby when electrical signals in said selected frequency band are applied across said first and second conductive means, it causes an acoustic surface wave to propogate on said piezoelectric substrate.

6. An acoustic surface wave transducer as specified in claim 5 wherein the fingers of said first and second arrays have a width of one-sixth an acoustic wavelength at a selected frequency in said frequency band.

* * * * *